May 12, 1953  E. G. SPRUNG  2,638,017
BRAKE LEVER
Filed July 16, 1948
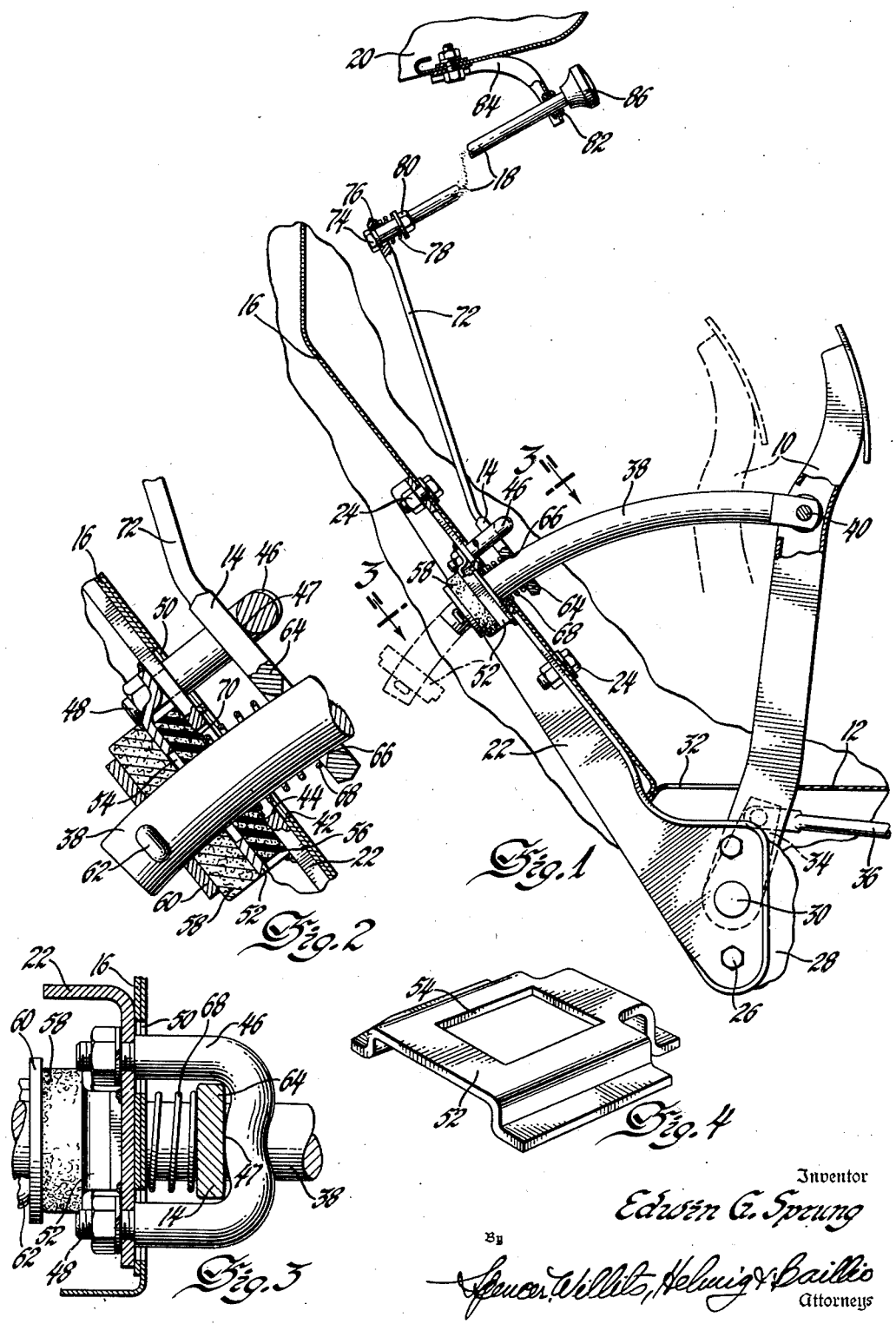
Inventor
Edwin G. Sprung
By
Spencer, Willits, Helmig & Baillio
Attorneys Patented May 12, 1953

2,638,017

UNITED STATES PATENT OFFICE 2,638,017

BRAKE LEVER

Edwin G. Sprung, Detroit, Mich., assignor to General Motors Corporation, Detroit, Mich., a corporation of Delaware Application July 16, 1948, Serial No. 39,077

12 Claims. (Cl. 74—541)

This invention relates to a vehicle brake lever assembly, and more particularly to a releasable friction detent to hold a brake lever in any position of movement.

The object of this invention is to provide a simplified one-way friction detent for a brake lever which will stop the lever in any position of movement.

Another object of this invention is to provide a foot-operated brake lever with a detent mounted on the floor of a vehicle and provided with a dirt seal and return stop and silencing mechanism.

Another object of this invention is to provide a foot-operated brake lever with a remote control mounted on the vehicle dash panel for releasing the brake lever.

Other objects and advantages will be apparent from the following description of a specific embodiment of the invention.

Figure 1 is a fragmentary view of portions of a vehicle with the brake lever and detent.

Figure 2 is an enlarged view of a portion of Figure 1 showing the detent.

Figure 3 is an enlarged sectional view on the section line 3—3 of Figure 1.

Figure 4 is a perspective view of the stop plate shown in Figure 1.

The foot-operated emergency brake lever mechanism and the adjacent portions of the vehicle are shown in Figure 1. The foot lever 10 with a suitable foot pad extends above the floor-boards 12, and is held in braking position by the friction detent 14 on the toe-boards 16. The detent is controlled by the hand release rod 18 mounted on the dash 20.

The brake mechanism is mounted as a unit on the elongated bracket 22, which is secured by bolts 24 to the toe-boards 16, and by bolts 26 to a bracket 28 mounted on the vehicle frame or directly to the vehicle frame. The shaft 30 is pivotally mounted on the bracket 22 and extends transversely of the vehicle. The brake lever 10 extends through slot 32 in the floor-boards and is fixed to shaft 30 adjacent the bracket 22.

The shaft 30 generally extends to the center of the vehicle where it is connected to the brake rod 36 by the crank 34. The brake rod is connected to brakes (not shown) having the usual spring reaction which will tend to return the brake lever to the off or released position, shown in full lines.

An arcuate detent rod 38 of generally circular cross section passes through the friction detent 14 and is pivoted at one end to the lever 10 by a pin 40. The toe-boards 16 have an aperture 42, and the bracket 22 has an aperture 44 to allow the rod 38 to pass through when the lever 10 is actuated. The apertures 42 and 44 are positioned the same distance from shaft 30 as pin 40, so that the rod 38 will move in a circular path. The aperture 44 is large enough to provide ample clearance around the rod, and the aperture 42 is larger than aperture 44 to accommodate inaccuracies in locating the bracket 22 on the toe-boards. The clearance of the rod 38 in the apertures 42 and 44 give the rod limited transverse movement as the lever 10 is depressed or released.

A guide 46 of U shape with shouldered and threaded ends 48 is bolted to the bracket 22. The base of the U-shaped guide 46 has a convex internal surface or rounded or bulbous protrusion 47 which engages the detent 14. Apertures 50 are provided in the toe-board 16 to allow the guide to pass therethrough. An elongated slot may be substituted for apertures 50 if it is desired to attach the guide to the bracket before securing the bracket to the toe-board. On the other side of the bracket 22 a stop or retainer 52 having a central hole 54 and side flanges as shown in Figure 4 is welded to the bracket with the hole 54 aligned with apertures 42 and 44. A bushing or seal 56 formed of a resilient material such as leather, fibrous material or rubber is slidably fitted on the rod 38 and secured between the retainer 52 and bracket 22 to block or seal the aperture in the toe-board around the rod 38. The bumper 58, which is made of a compressible damping or silencing material such as felt or other fibrous material or rubber, is tightly fitted on the rod and held against lateral displacement by the washer 60 and cotter pin 62, and engages the stop or retainer 52 to limit return movement of rod 38.

The rocking friction detent 14 has a head 64 of generally rectangular shape positioned under the guide 46 and engaging the rounded protrusion 47 and having an aperture 66 slightly larger than the rod which passes through it. The inner surface of aperture 66 has a V-shaped cross section with a small flat at the apex of the V to provide a sharply defined and small friction detent area. The spring 68 is compressed between the bushing 56 and the detent head 64 to urge the detent toward locking position. A washer 70 may be provided to protect bushing 56.

The detent 14 has, in addition to the head portion 64, an elongated extension 72 extending above the top of lever 10 and being substantially longer than the head 64. The extension 72 is connected to the release rod 18 by a connection consisting of a nut 74 threaded on the rod and having an annular portion of a spherical surface which engages a similar spherical surface within the aperture 76 on extension 72. A spring 78 held by abutment 80 on the rod 18 resiliently holds the two spherical surfaces together but allows universal pivotal movement. The rod 18 is mounted in a friction bushing 82 held by support 84 on the dash 20, and has a suitable handle 86. The upper end of the detent extension or lever 72 is positioned midway between the floor 12 and the dash 20, or preferably nearer to the dash, so that a straight rod 18 may be employed to connect the detent lever to the handle 86 on the dash and provide for substantially horizontal or slightly sloping movement of the handle in releasing the detent.

When the brake lever 10 is operated by foot pressure on the foot-pad the rod 38 starts moving to the left through the detent mechanism. The head 64 of detent 14 will be in frictional engagement with the rod 38, and will move with the rod and compress the spring 68. Since the extension 72 of the detent 14 is pivotally mounted on the rod 18, the detent 14 will tilt or rotate toward alignment with rod 38, so that rod 38 will slide through the aperture 66 in the detent with little frictional resistance. When the operating pressure is removed from lever 10 the spring reaction of the brakes will tend to return the lever to the off position as shown in Figure 1. However, the slight friction existing between the rod 38 and detent 14 and the force of spring 68 will tend to carry the detent back with the rod. When the detent moves back it will tilt or rotate to securely grip the rod 38, and will abut the guide 46 to releasably hold the rod in the brake-applied position. The detent head 64 contacts the convex or rounded portion 47 on the inner side of guide 46, and thus may rock transversely to maintain proper alignment with the rod 38.

The brakes are released by pulling rod 18 to the right by handle 84, and thus tilting the detent with guide 46 acting as a pivot so that it is in alignment or perpendicular with the rod and releases the friction grip. The detent rod 38 will then return to brake-released position. A bumper 58 is secured on the end of the rod and engages the stop or retainer 52 to stop this return movement without shock and noise. The bushing 56 seals the apertures in the floor-boards to prevent dirt and water entering the vehicle and to provide a silent guide for the rod 38.

The lever pivot and detent mechanism are mounted on the bracket 22 and they may be assembled on the vehicle as a unit. This eliminates the necessity of maintaining close tolerances in the floor and the toe-board assemblies of the body.

The extension 72 of the detent 14 extends above the brake lever 10 to provide clearance between the lever and release rod 18, and allows a substantially straight rod reciprocally mounted on the dash to be directly connected to the extension 72 of the detent. In addition, since the extension 72 is substantially longer than head 64, the linkage has a large mechanical advantage and the release rod may be operated with a minimum of effort.

The specific embodiment of the invention described above is illustrative of the invention. It will be apparent to those skilled in the art that numerous modifications may be made within the scope of the appended claims.

I claim:

1. In a brake lever assembly, a mounting bracket, a lever pivoted to said bracket, an aperture in said bracket, a rod pivoted at one end to said lever and extending through said aperture, a guide secured to said bracket adjacent said aperture and having a pivot portion facing said bracket, a detent with a head portion positioned between said guide and bracket and engaging said pivot portion, a hole in said head portion through which said rod extends to releasably grip said rod when the head portion is tilted, a spring compressed between said head and bracket resiliently holding said detent in engagement with said pivot portion and urging said head portion toward the tilted position, an elongated detent lever on said head portion to provide a large mechanical advantage, and detent operating means connected to said extension.

2. The invention defined in claim 1, said guide consisting of a U-shaped member.

3. The invention defined in claim 1, said guide consisting of a U-shaped member, a bulbous protrusion on the inside surface at the base of said U-shaped member, said detent engaging said protrusion for tilting movement to engage said rod and transverse rocking movement to maintain alignment with said rod.

4. The invention defined in claim 1, said elongated detent lever extending beyond the end of said brake lever and a rod pivotally connected to said detent lever for tilting said detent.

5. The invention defined in claim 1, a resilient bumper attached to the free end of said rod to resiliently stop return movement of the lever.

6. In a lever assembly, a mounting, a rod slidably supported on said mounting, a U-shaped guide fixed to said mounting and having a pivot portion facing said mounting, a detent positioned between said mounting and guide and having a part engaging said pivot portion, said detent having a head portion releasably engaging said rod, a compression spring positioned between said mounting and said detent resiliently holding said detent in contact with said pivot portion of the guide and in releasable engagement with said rod.

7. In a lever assembly, a mounting, a rod slidably mounted on said mounting, a U-shaped guide fixed to said mounting and having a convex pivot portion at the base of the U facing said mounting, a detent positioned between said mounting and guide and having a part engaging said pivot portion, said detent having a head portion, an aperture in said head having a diameter slightly larger than said rod, said rod being positioned in said aperture, said head releasably gripping said rod when it is tilted, a compression spring surrounding said rod and positioned between said mounting and said detent resiliently holding said detent in contact with said pivot portion of the guide and in releasable gripping engagement with said rod.

8. In a lever assembly, a mounting, a rod slidably mounted on said mounting, a guide fixed to said mounting and having a convex pivot portion facing said mounting, a detent positioned between said mounting and guide and having a part engaging said convex pivot portion for pivotal and rocking movement, said detent having a head portion releasably gripping said rod, a compression spring positioned between said mounting and said detent resiliently holding said detent in contact with said pivot portion of the guide and releasably gripping said rod.

9. In a brake lever assembly, a pivoted lever, a detent rod connected to said lever, a friction detent member having an aperture, said rod passing through said aperture, a U-shaped pivot and stop element for said detent member having a convex protrusion at the inside surface of the base of said U-shaped portion, said detent pivotally and transversely rockably contacting said convex protrusion and adapted to pivot for locking said rod and rock to maintain proper alignment with said bar.

10. In a vehicle having floor boards and a dash panel, a mounting bracket attached to said floor boards, a lever pivoted at one end to said bracket, a rod pivoted to the other end of said lever, said rod being slidably supported by said bracket, a detent supported on said rod at one end, a convex fulcrum attached to said bracket engaging said detent, said detent pivoting on said convex fulcrum to engage and disengage said rod and transversely rocking on said convex fulcrum for alignment with said rod, the other end of said detent terminating above said lever, a rod reciprocally mounted on said dash, a universal joint operatively connecting the said other end of the detent to the reciprocally mounted rod.

11. In a vehicle having floor boards and a dash panel, a lever pivotally mounted at one end on said floor boards and having an operating portion at the other end, a rod pivotally mounted on said other end of said lever, the other end of said rod being slidably supported by said floor boards, a detent member having a first portion and a second portion, said second portion being much longer than said first portion, said detent member being rockably and movably secured between said first and second portions to said floor boards closely adjacent said rod, said first portion of said detent member extending downwardly and releasably engaging said rod, said second portion of said detent member extending upwardly and terminating in an end portion located a substantial distance above said lever, a substantially straight and horizontally extending rod reciprocally mounted on said dash and connected to the free end of said second portion of said detent to release the lever.

12. In a control lever assembly, a support, a pivoted lever pivoted to said support, a rod pivotally connected to said lever, a stop and pivot element fixed to said support and having a convex protrusion, said rod being movably longitudinally past said stop and pivot element and having limited transverse movement with respect to said stop and pivot element, a detent member frictionally engaging said rod to prevent return movement when engaged, said detent member pivotally and transversely rockably engaging said convex protrusion, operating means connected to said detent member to rock said detent from locked to unlocked position, said detent being transversely rockable to maintain proper alignment with said rod.

EDWIN G. SPRUNG.

References Cited in the file of this patent

UNITED STATES PATENTS

| Number | Name | Date |
| --- | --- | --- |
| 1,174,376 | Anderson | Mar. 7, 1916 |
| 1,412,397 | Flagg | Apr. 11, 1922 |
| 1,463,676 | Custer | July 31, 1923 |
| 1,615,940 | Forsyth | Feb. 1, 1927 |
| 1,707,747 | Whitten | Apr. 2, 1929 |
| 1,823,695 | Moorhouse | Sept. 15, 1931 |
| 2,108,666 | Hall | Feb. 15, 1938 |
| 2,180,209 | Johnson | Nov. 14, 1939 |
| 2,186,277 | Tetens | Jan. 9, 1940 |
| 2,341,465 | Monnot | Feb. 8, 1944 |
| 2,387,126 | Dillon | Oct. 16, 1945 |
| 2,389,199 | Laird | Nov. 20, 1945 |
| 2,438,380 | Arens | Mar. 23, 1948 |
| 2,448,480 | Willett | Aug. 31, 1948 |
| 2,463,657 | Thompson | Mar. 8, 1949 |

FOREIGN PATENTS

| Number | Country | Date |
| --- | --- | --- |
| 626,578 | Great Britain | July 18, 1949 |